(12) United States Patent
Niizeki et al.

(10) Patent No.: US 8,132,414 B2
(45) Date of Patent: Mar. 13, 2012

(54) STEAM TURBINE AND HYDROPHILIC COATING MATERIAL USED THEREFOR

(75) Inventors: Yoshiki Niizeki, Tokyo (JP); Akio Sayano, Kanagawa-Ken (JP); Naoki Shibukawa, Saitama-Ken (JP); Norihisa Saito, Kanagawa-Ken (JP); Masashi Takahashi, Kanagawa-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 416 days.

(21) Appl. No.: 11/588,416

(22) Filed: Oct. 27, 2006

(65) Prior Publication Data

US 2007/0101719 A1  May 10, 2007

(30) Foreign Application Priority Data

Oct. 31, 2005 (JP) ................ P2005-317609

(51) Int. Cl.
*F01K 1/00* (2006.01)
*B63H 1/26* (2006.01)

(52) U.S. Cl. .......... 60/670; 416/241 R; 416/241 A

(58) Field of Classification Search .......... 416/228, 416/235, 237, 241 R, 241 B, 241 C, 236 R, 416/241 A; 60/670
See application file for complete search history.

(56) References Cited

U.S. PATENT DOCUMENTS

| 3,053,627 | A | * | 9/1962 | Flemmert | .............. 423/336 |
| 4,566,700 | A | | 1/1986 | Shiembob | |
| 6,004,102 | A | | 12/1999 | Kuefner et al. | |
| 6,013,372 | A | | 1/2000 | Hayakawa et al. | |
| 6,203,021 | B1 | | 3/2001 | Wolfla et al. | |
| 2002/0098083 | A1 | * | 7/2002 | Blangetti et al. | .............. 415/200 |
| 2004/0126225 | A1 | | 7/2004 | Ghasripoor et al. | |

FOREIGN PATENT DOCUMENTS

| EP | 1 447 208 A2 | 8/2004 |
| GB | 2 399 777 A | 9/2004 |
| JP | 59-7705 A | 1/1984 |
| JP | 61-257466 A | 11/1986 |
| JP | 01-219301 A | 9/1989 |
| JP | 7-42506 A | 2/1995 |
| JP | 8-210105 A | 8/1996 |
| JP | 11-500808 | 1/1999 |
| JP | 2002-195004 | 7/2002 |
| JP | 2004-270484 A | 9/2004 |
| SU | 615240 A1 | 7/1978 |
| SU | 1507991 A1 | 9/1989 |
| WO | WO 2005/056985 A1 | 6/2005 |

* cited by examiner

*Primary Examiner* — Hoang Nguyen
(74) *Attorney, Agent, or Firm* — Foley & Lardner LLP

(57) ABSTRACT

A steam turbine includes a bucket implanted in a turbine rotor and a nozzle disposed on an upstream side of the bucket and supported by a turbine casing, in which a plurality of stages, each including the bucket and the nozzle, are arranged axially in the turbine so as to define a steam path. A hydrophilic coating portion is disposed in the entire area or an area of at least one portion of a circumferential surface of the turbine rotor, surfaces of the nozzles, surfaces of the buckets, and an inner circumferential surface of the turbine casing.

20 Claims, 11 Drawing Sheets

| | SLIT SHAPE | PRESENCE OR ABSENCE OF COATING | PROPORTION OF AMOUNT OF WATER COLLECTED THROUGH SLIT TO AMOUNT OF WATER SUPPLIED (B%) | PROPORTION OF AMOUNT OF RECOVERED WATER TO AMOUNT OF SUPPLIED WATER (A+B) (%) |
|---|---|---|---|---|
| A |  | ABSENCE | 0.00 | 74.95 |
| | | PRESENT | 10.00 | 72.11 |
| B |  | ABSENCE | 44.95 | 71.16 |
| | | PRESENT | 62.84 | 76.11 |
| C |  | ABSENCE | 0.00 | 65.79 |
| | | PRESENT | 0.00 | 74.00 |
| D |  | ABSENCE | 0.00 | 63.68 |
| | | PRESENT | 0.00 | 65.16 |
| E |  | ABSENCE | 0.00 | 73.79 |
| | | PRESENT | 49.05 | 72.95 |

STEAM TURBINE AND HYDROPHILIC COATING MATERIAL USED THEREFOR

BACKGROUND OF THE INVENTION

1. Field of the Invention

The present invention relates to improvements in the performance of steam turbines, and particularly to a steam turbine including nozzles, buckets, a casing, a turbine rotor, and a hydrophilic coating portion disposed on such components to prevent erosion, and also relates to a hydrophilic coating material used for the hydrophilic coating portion of the steam turbine.

2. Related Art

Steam turbines convert the energy of high-temperature, high-pressure steam generated by a boiler into rotational energy by supplying the steam to cascades of nozzles (stationary blades) and buckets (moving blades). FIG. 9 shows the mechanism of a power-generation system based on a steam turbine.

Steam generated by a boiler 1 is further heated by a heater 2 and is introduced into a steam turbine 3. Referring to FIG. 10, the steam turbine 3 includes a turbine rotor 4 implanted with buckets (moving blades) 5 circumferentially and a casing 13 supporting nozzles (stationary blades) 6. The buckets 5 and the nozzles 6 are combined into stages 7 arranged in the axial direction of the turbine rotor 4.

The steam introduced into the steam turbine 3 is expanded through a steam path 8. The turbine rotor 4 then converts the energy of the steam at high temperature and high pressure into rotational energy. Referring back to FIG. 9, the rotational energy is transferred to a motor 9 connected to the turbine rotor 4. The motor 9 converts the rotational energy into electrical energy.

The steam, which has lost its energy, is discharged from the steam turbine 3 and is introduced into a condenser 10 which cools the steam with a cooling medium 11, such as sea water, to condense it into water. A feed pump 12 feeds the water to the boiler 1 again.

The steam turbine 3 is composed of a high-pressure turbine, an intermediate pressure turbine, and a low-pressure turbine, depending on the temperature and pressure of the steam to be supplied. For the power-generation system described above, particularly a wet steam having a moisture content of about 10% flows near the final stage of the low-pressure turbine because the steam temperature has decreased. In a steam turbine used for a nuclear power plant, a high-pressure turbine stage operates with wet steam because saturated steam is initially supplied.

When wet steam flows through the nozzles 6, moisture contained in the steam condenses into water droplets on the nozzles 6. These water droplets are combined into coarse water droplets which are scattered by the steam flow and collide with the buckets 5 downstream of the nozzles 6. The collision tends to damp the torque of the buckets 5 and thus decrease the total performance of the turbine 3. The coarse water droplets also contribute to erosion of surfaces of the buckets 5. The erosion decreases the thickness of the buckets 5 and thus shortens the life thereof. This problem has increasingly become serious as longer blades are used for final turbine stages.

Practical operation of the buckets 5 and the nozzles 6 with wet steam will be described in detail.

FIG. 11 is a schematic diagram illustrating the behavior of wet steam and water droplets in the vicinity of blade cascades operating with the steam.

Moisture 14 contained in the steam is mainly deposited on concave surfaces of the nozzles 6 to form water films 15. The water films 15 appear significantly in the middle of the nozzles 6 and flow to the trailing edges thereof while increasing in thickness. The water films 15 are released from the trailing edges of the nozzles 6 into a main stream (operating steam) as water droplets 16. If the water films 15 are thick, large and coarse water droplets are released.

FIG. 11 illustrates a velocity diagram showing the difference in behavior between the steam and the coarse water droplets 16. According to the velocity diagram, the coarse water droplets 16 released from the trailing edges of the nozzles 6 have a velocity lower than the steam and thus flow to the buckets 5 at a velocity higher than the steam. In addition, the coarse water droplets 16 collide with the buckets 5 at an angle that is significantly different from the angle of the steam. Therefore, the collision of the coarse water droplets 16 causes significant erosion at the tips of the buckets 5, particularly on the convex side thereof.

FIG. 12 is a schematic diagram illustrating the behavior of the water droplets 16 on the concave surfaces of the nozzles 6.

In practice, the water films 15 do not appear uniformly on the nozzles 6, but appear locally as water film flows 17. The thickness of the water film flows 17 increases at an accelerating rate as they gather to the trailing edges of the nozzles 6. The water film flows 17 are released into the main stream as the coarse water droplets 16. This release does not occur uniformly over the height of the nozzles 6, but occur locally and irregularly. The coarse water droplets 16 thus result from the localization of the water film flows 17 and the formation of extremely thicker water films at the trailing edges of the nozzles 6 than other portions thereof.

FIG. 13 is a graph showing the relationship between the size of the water droplets 16 and the amount of erosion of blades attacked by the water droplets 16.

Referring to FIG. 13, the amount of erosion increases at an accelerating rate as the size of the water droplets 16 increases, and this means that prevention of the formation of the coarse water droplets 16 is effective against erosion.

FIG. 14 is a graph showing the distribution of wetness along the height of the blades.

According to FIG. 14, the centrifugal force of the rotation of the buckets 5 causes a large amount of water droplets to gather to outer portions of the buckets 5 while the swirling of the steam flow causes a large amount of water droplets to gather to outer portions of the nozzles 6. The water film flows 17, and thus the coarse water droplets 16, appear significantly on the outer portions of the buckets 23 and the nozzles 6.

One of the techniques for reducing the effect of wet stream is the removal of the coarse water droplets 16 from the steam flow. Japanese Unexamined Patent Application Publication No. 8-210105, for example, discloses a drain catcher provided by forming a suction outlet in a casing accommodating buckets to recover water droplets with the aid of the centrifugal force of a steam flow. In addition, Japanese Unexamined Patent Application Publication No. 7-42506 discloses a slit nozzle capable of sucking water droplets through a slit formed in a surface thereof. Such techniques have been put to practical use.

Referring to FIG. 15, furthermore, grooves 18 may be formed on the buckets 5 so as to extend in the radial direction. These grooves 18 can cause the water droplets 16 to flow and fly to the outside of the buckets 5 so that a drain catcher 19, for example, can recover the water droplets 16. The effect of wet steam can also be reduced by increasing the intervals between the nozzles 6 and the buckets 5. This technique decreases the size of the water droplets 16 and facilitates the acceleration thereof to reduce the velocity of the collision of the water droplets 16 with the buckets 5.

On the other hand, Japanese Unexamined Patent Application Publication No. 10-280907 discloses an example of a technique for inhibiting erosion of blades. According to this publication, a hard coating or material with excellent erosion resistance is applied to the ends of the leading edges of blades. For example, Stellite, a cobalt-based alloy, is used for 12Cr alloy steels, and a Ti-15 Mo-5 Zr-3 Al-based alloy coating is used for titanium alloys.

Among the above techniques for reducing the effect of wet steam, the removal of water droplets requires a significantly complicated removal mechanism and thus increases production cost. The formation of openings in a steam path or an additional structure on blade surfaces to remove water droplets can cause aerodynamic loss leading to decreased turbine performance. In addition, it is difficult for water droplets to selectively remove and discharge from a steam, and such techniques undesirably discharge part of the steam which would otherwise generate work together with water droplets, thus lowering turbine efficiency.

Increasing the intervals between the nozzles 6 and the buckets 5 not only can cause aerodynamic loss, but also can result in larger mechanical dimensions. This imposes serious design limitations in terms of ensuring reliability because, for example, a longer turbine rotor can cause larger vibrations.

The application of a hard coating or material with erosion resistance requires a sophisticated welding technique, and blazing can decrease the strength of blade substrates. In addition, hard materials are expensive, and sufficient reliability cannot be ensured in terms of, for example, adhesion strength because the use of longer buckets is associated with the collision of water droplets at higher velocities.

Thus, any of the known techniques for reducing the effect of wet steam can trade off turbine performance, reliability, or cost for the reduction of the effect of wetness, and a solution to that problem is urgently necessary.

SUMMARY OF THE INVENTION

The present invention was conceived in consideration of the above circumstances in the prior art and an object of the present invention is to provide a highly efficient and highly reliable steam turbine capable of reducing the effect of wet steam without causing aerodynamic loss, decreasing reliability or significantly increasing cost, and also to provide a hydrophilic coating material used for the steam turbine.

The above and other objects can be achieved according to the present invention by providing a steam turbine comprising:

a turbine casing;

a turbine rotor disposed in the turbine casing;

a bucket implanted in the turbine rotor; and a nozzle disposed on an upstream side of the bucket and supported by the turbine casing, in which a plurality of stages, each including the bucket and the nozzle, are arranged axially in the turbine so as to define a steam path, wherein a hydrophilic coating portion is disposed in the entire area or an area of at least one portion of a circumferential surface of the turbine rotor, surfaces of the nozzles, surfaces of the buckets, and an inner circumferential surface of the turbine casing.

In the above aspect, it may be desired that the hydrophilic coating portion is disposed in an area of a convex surface of the bucket along a leading edge thereof. The area of the bucket where the hydrophilic coating portion is disposed may satisfy the following condition:

$$0 \leq L/C \leq 0.5$$

wherein "C" is a chord length of the bucket and "L" is a length of the area where the hydrophilic coating portion is disposed from the leading edge of the bucket along the chord length thereof.

It may be desired that the hydrophilic coating portion has a thickness of 0.05 to 150 μm. If the hydrophilic coating portion has a thickness of less than 0.05 μm, it can be partially lost originally or by slight wear. If the hydrophilic coating portion has a thickness of more than 150 μm, it can cause problems such as peeling due to decreased adhesion strength. In such cases, it is difficult to maintain sufficient hydrophilicity.

It may be desired that the hydrophilic coating portion has an open porosity of 30% or less. If the hydrophilic coating portion has an open porosity exceeding 30%, the mechanical properties thereof, including strength and wear resistance, can be significantly decreased. In that case, the steam turbine may be difficult to put to practical use. On the other hand, the open porosity may be decreased to 0%.

The hydrophilic coating portion may be disposed in a predetermined area extending along a height direction of the bucket.

The hydrophilic coating portion may be disposed in an area of the nozzle and the bucket which extends to an upstream side from a trailing edge thereof by a length of at least 10 mm.

The hydrophilic coating portion may be disposed in an area of the nozzle and the bucket so as to satisfy the following condition:

$$0.3 \leq h/H \leq 1.0$$

wherein "H" is a height of the nozzle and the bucket and "h" is a height of the area where the hydrophilic coating portion is disposed.

The nozzle may be provided with a slit which communicates with an inside thereof, and the hydrophilic coating portion is disposed on an entire surface of the nozzle where the slit is provided. In this case, the hydrophilic coating portion may be disposed in a predetermined area on an upstream side of the slit.

It may be desired that the openings are provided in the inner circumferential surface of the turbine casing, and the hydrophilic coating portion is disposed on the inner circumferential surface of the turbine casing. In this case, it may be desired that the openings are provided in areas of the inner circumferential surface of the turbine casing on a downstream side of the trailing edge of the nozzle and near the leading edges of the buckets disposed downstream of the nozzles, and the hydrophilic coating portion is disposed in a vicinity of each of the openings.

The hydrophilic coating portion may include a water-repellent coating portion adjacent to a film area of the hydrophilic coating portion.

The hydrophilic coating portion may have a water contact angle of 20° or less. FIG. 8 is a schematic diagram illustrating the definition of the contact angle between a hydrophilic coating portion and a water droplet deposited thereon. The contact angle θ between a hydrophilic coating portion 21 and a water droplet 28 is defined by the following condition:

$$\theta = 2 \tan^{-1}(h/r)$$

wherein "r" is a radius of the water droplet 28 and "h" is the height of the water droplet 28. If the contact angle exceeds 20°, it is difficult to form or keep sufficiently fine water droplets or sufficiently thin water films on the hydrophilic coating portion 21. In that case, the hydrophilic coating portion has an insufficient effect of enhancing performance and inhibiting erosion.

In another aspect of the present invention, there is also provided a hydrophilic coating material used for the hydrophilic coating portion mentioned above, the hydrophilic coating material comprising an oxide ceramic. This oxide ceramic contains a metal oxide such as silicon oxide ($SiO_2$), titanium oxide ($TiO_2$), zirconium oxide ($ZrO_2$), or aluminum oxide ($Al_2O_3$). In general, oxide ceramics are known to have higher hydrophilicity than other types of materials. In particular, silicon oxide can exhibit high hydrophilicity, depending on the process used for production thereof. Titanium oxide, which has attracted attention for its function as a photocatalyst, can exhibit superhydrophilicity (extremely high hydrophilicity), depending on the ambient environment, particularly, under ultraviolet radiation.

In this case, it may be desired that the oxide ceramic mainly contains at least one of silicon oxide and titanium oxide. Use of a precursor of an amorphous metal compound, such as an organometallic compound, is advantageous in terms of forming a hard ceramic coating. It is preferred that a metal substrate coated with such an amorphous metal compound be heated at the lowest possible temperature to inhibit deterioration of the substrate. In this case, the resultant ceramic coating is amorphous. If the hydrophilic coating portion has a thickness of less than 0.05 μm, it can be partially lost originally or by slight wear. If the hydrophilic coating portion has a thickness of more than 150 μm, it can cause problems such as peeling due to decreased adhesion strength. In such cases, sufficient hydrophilicity may be difficult to maintain.

If the hydrophilic coating portion has an open porosity exceeding 30%, the mechanical properties thereof, including strength and wear resistance, can be significantly decreased. In that case, the steam turbine may be difficult to put to practical use. On the other hand, the open porosity may be decreased to 0%.

In the steam turbine according to the aspects of the present invention described above, the hydrophilic coating portion is disposed in the entire area or an area of at least one of the circumferential surface of the turbine rotor, the surfaces of the nozzles, the surfaces of the buckets, and the inner circumferential surface of the turbine casing. If, for example, the hydrophilic coating portion is disposed on the nozzles, it can form fine water droplets while inhibiting formation of coarse water droplets, thus improving the turbine efficiency and suppressing erosion.

The nature and further characteristic features of the present invention will be made clearer from the following descriptions made with reference to the accompanying drawings.

DESCRIPTION OF THE PREFERRED EMBODIMENTS

Steam turbines and hydrophilic coating materials used therefor according to embodiments of the present invention will be described hereunder with reference to the accompanying drawings.

Beforehand the description to various embodiments of the present invention, a general steam turbine to which the present invention is applicable will be first explained with reference to FIG. 17.

Figure 17:
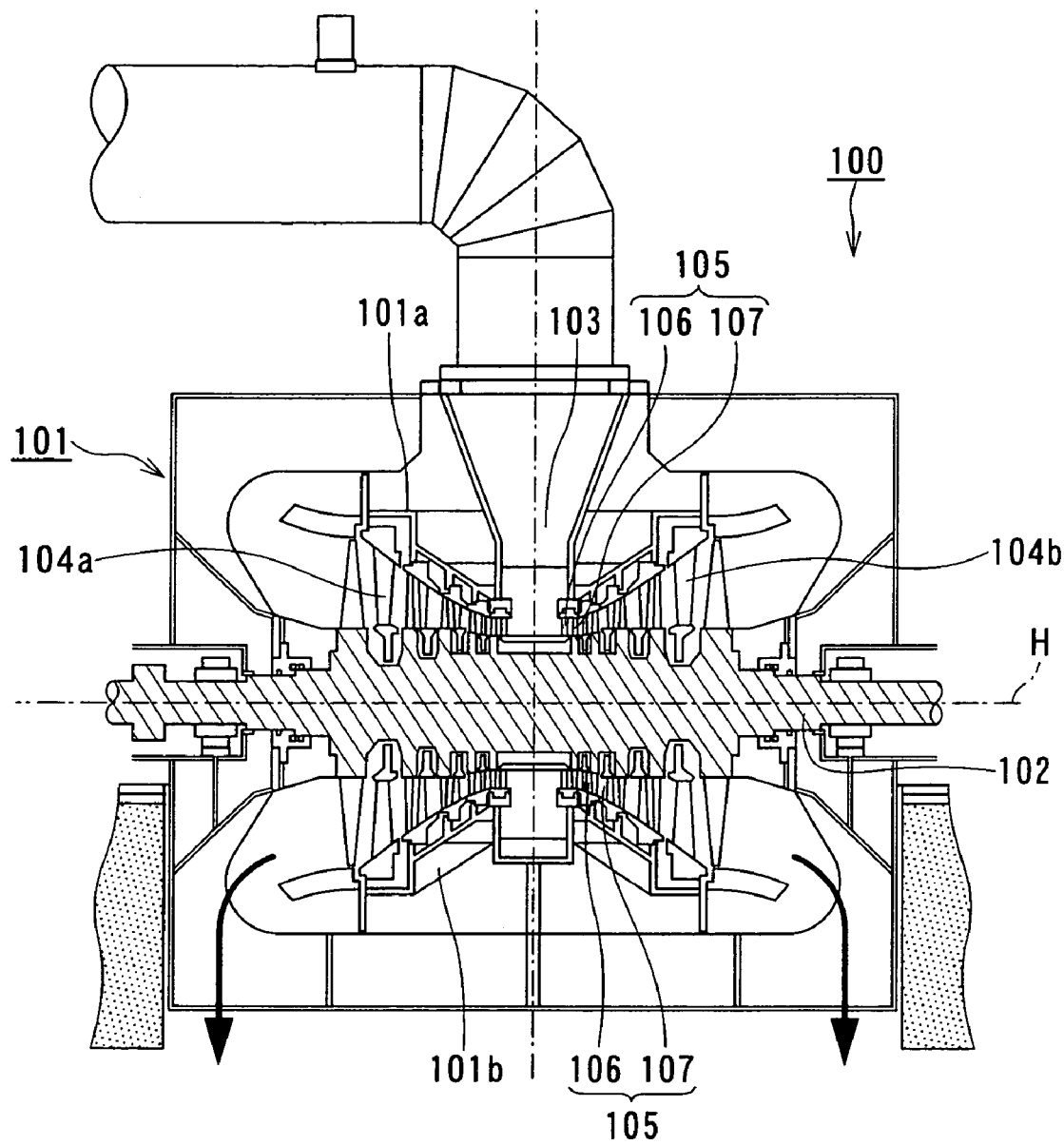
FIG. 17 illustrates a longitudinal section showing a structure of a general steam turbine to which the present invention is applicable.

Referring to FIG. 17, a steam turbine 100 is provided with a turbine casing 101 of a double-turbine casing including inner and outer casings, and the inner casing is composed of splittable upper and lower casings 101a and 101b. Inside the turbine casing 101, there is disposed a turbine rotor 102 crossing a steam inlet portion 103 so as to extend along a center line H of the cross sectional view. Steam passages 104 (104a and 104b) are formed between the turbine rotor 102 and the upper and lower casings 101a and 101b, respectively, so that the steam flows laterally separately.

A plurality of turbine stages 105 (106, 107) are provided in the steam passages 104, each of the turbine stages 105 including a nozzle (stationary blade) 106 which is provided to the inner casing and a bucket (moving blade) 107 which is implanted to the rotor 102.

The steam is introduced into the seam turbine casing 101 through the steam inlet portion 103 and then to the turbine stage 105 through the steam passage 104.

First Embodiment

A first embodiment of the present invention will be described with reference to FIGS. 1 and 2.

In this embodiment, each of nozzles (stationary blades) 20 of stages that operate under wet conditions has a hydrophilic coating portion 21 formed in a limited area of a radially outer portion of a concave surface of the nozzle 20 along a trailing edge thereof.

Figure 12:
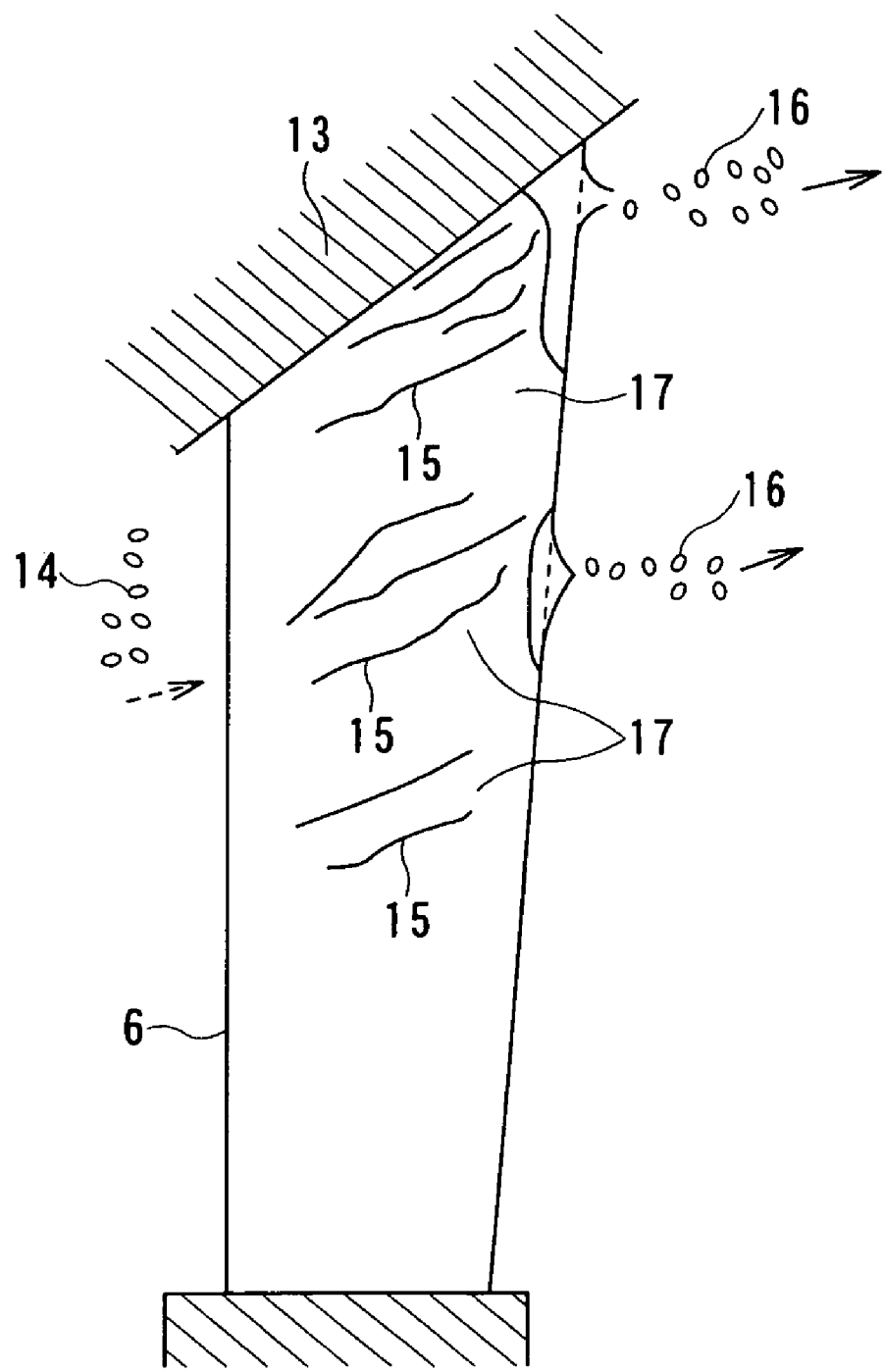
FIG. 12 is a diagram illustrating behavior of the water droplets on the nozzles of the steam turbine.
Figure 13:
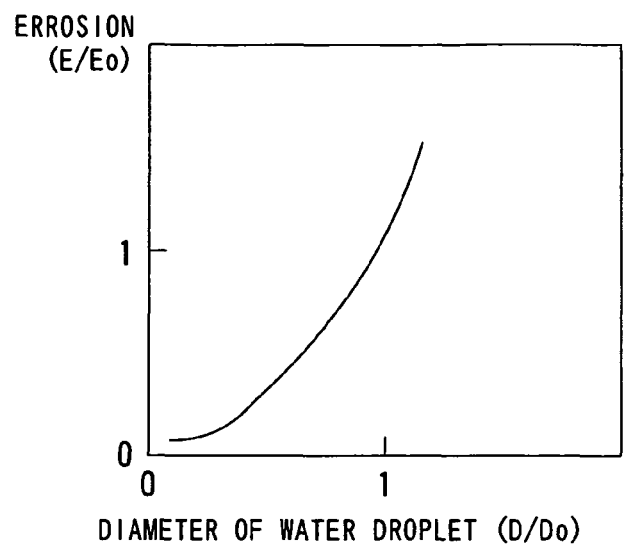
FIG. 13 is a graph showing a relationship between the size of the water droplets and the amount of erosion.
Figure 14:
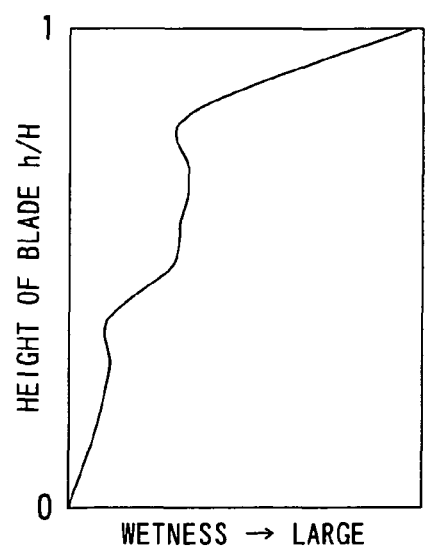
FIG. 14 is a graph showing a relationship between nozzle height and wetness for the known steam turbine.

Under wet conditions, as described with reference to FIG. 12, moisture 14 contained in an operating fluid is mainly deposited on the concave surfaces of the nozzles 6 to form water films 15. The water films 15 appear significantly in the middle of the nozzles 6 and flow to the trailing edges thereof while increasing in thickness. The water films 15 are released from the trailing edges of the nozzles 6 into a main stream (operating steam) as the water droplets 16. If the water films 15 are thick, large and coarse water droplets are released.

Figure 2:
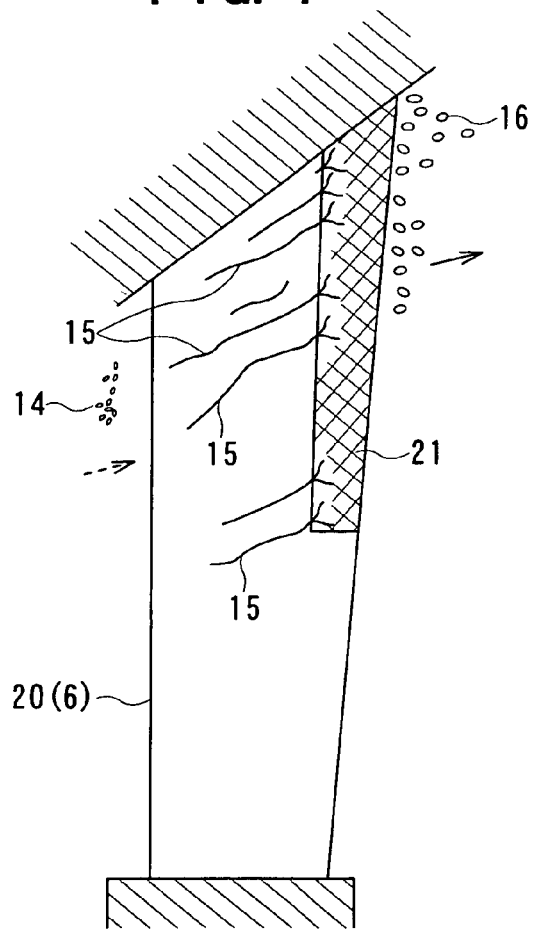
FIG. 2 is a diagram illustrating behavior of water droplets and water films on the nozzle having the hydrophilic coating portion according to the first embodiment.

In this embodiment, as shown in FIG. 2, a hydrophilic coating portion 21 is widely distributed to uniformly diffuse the water films 15, which can cause coarse water droplets. Unlike the known art, therefore, the hydrophilic coating portion 21 can inhibit formation of extremely thick water films at the trailing edge of the nozzle 20 to reduce the size of the water droplets 16 released from the trailing edge of the nozzle 20 and thus prevent coarse water droplets from being formed.

The hydrophilic coating portion 21 may also be formed on the overall surface of the nozzle 20, although its effect can be expected if the hydrophilic coating portion 21 is formed along the trailing edge of the nozzle 20, as described above. Specifically, the hydrophilic coating portion 21 may be formed in an area extending upstream from the trailing edge of the nozzle 20 by a length of at least 10 mm to ensure a sufficient effect. In addition, the hydrophilic coating portion 21 does not necessarily have to be formed over the entire trailing edge of the nozzle 20 because the water films 15 are not uniformly distributed over the entire trailing edge, but are locally distributed, particularly on the radially outer portion of the nozzle 20. The hydrophilic coating portion 21 is preferably formed in such an area that approximately satisfies the following condition:

$$0.3 \leq h/H \leq 1.0$$

wherein "H" is the height of the nozzle 20 and "h" is the height of the area where the hydrophilic coating portion 21 is formed.

The hydrophilic coating portion 21 is formed of a relatively hard coating, such as a $SiO_2$ coating, as described later. Because few water droplets 16 collide with the nozzle 20 in the area along the trailing edge thereof, the possibility of damage to the coating is extremely low, and thus the effect of the coating can be expected over an extended period of time. In addition, the boundaries of the hydrophilic coating portion 21 in the upstream direction and the longitudinal direction of the nozzle 20 do not necessarily have to be clearly defined. The effect of the hydrophilic coating portion 21 can be expected if it is reliably formed in the area along the trailing edge of the nozzle 20. The hydrophilic coating portion 21 can therefore be formed at significantly low cost without processing steps such as masking, or only with simple processing steps.

Furthermore, a sufficient effect can be expected even if the hydrophilic coating portion 21 has a thickness of less than 1 μm. The hydrophilic coating portion 21 therefore does not adversely affect the shape of the nozzle 20 or the surface roughness thereof.

According to this embodiment, as described above, the size of water droplets released from the trailing edge of the nozzle 20 can be minimized without performance degradation or significant cost increase by uniformly diffusing water film flows to reduce the thickness thereof. This allows for a reduction in the amount of erosion of buckets of the next stage due to water droplets.

Second Embodiment

Figure 3:
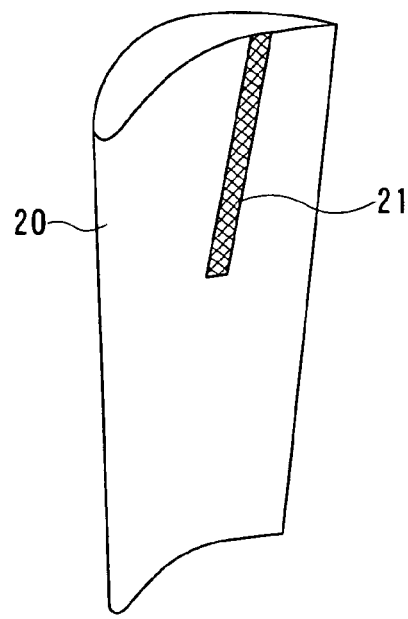
FIG. 3 is a diagram of a nozzle according to a second embodiment of the present invention.

A steam turbine and a hydrophilic coating material used therefor according to a second embodiment of the present invention will be described with reference to FIG. 3. In this embodiment, the same components as used in the first embodiment are indicated by the same reference numerals to remove redundant description.

Figure 15:
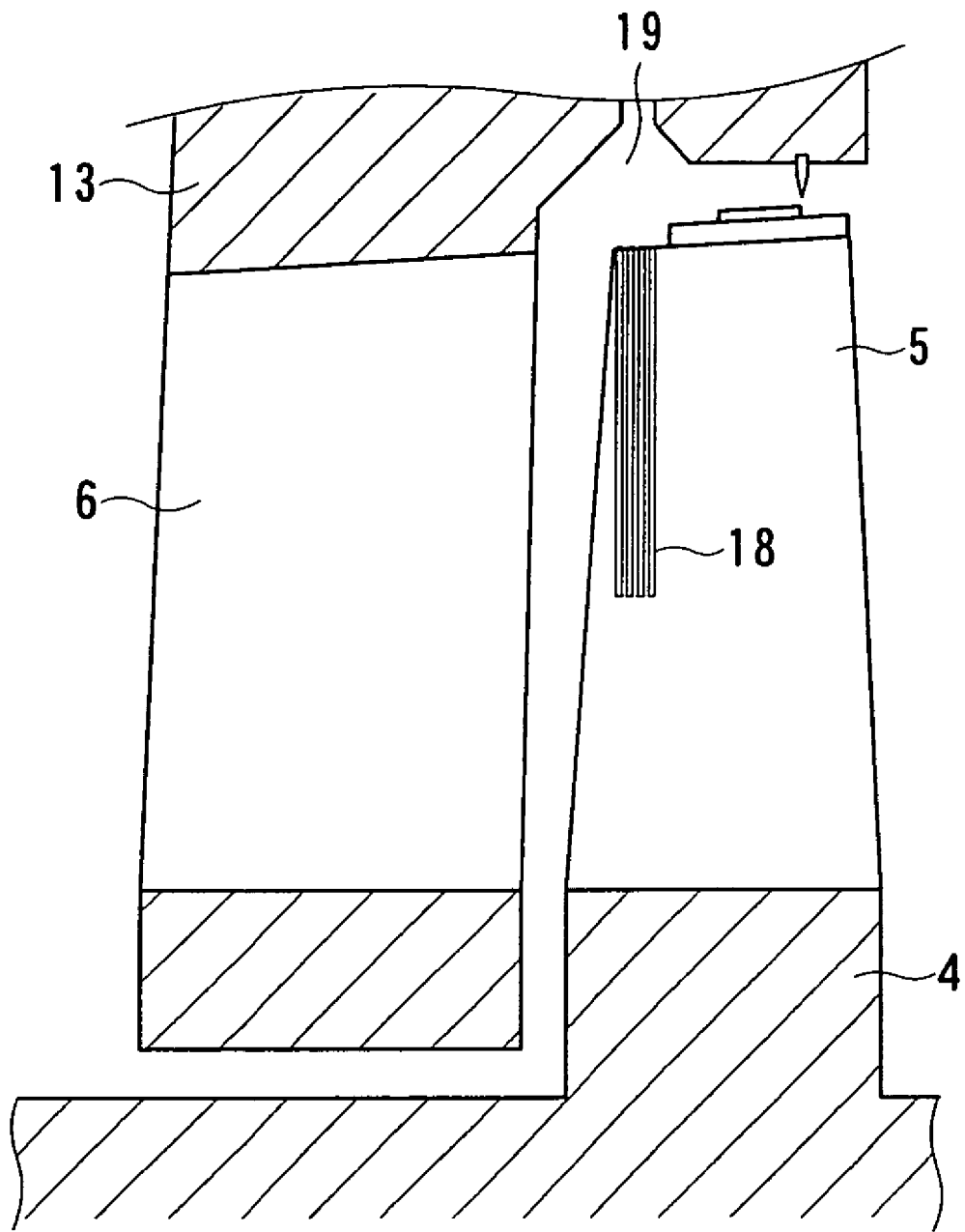
FIG. 15 is a diagram of an example of a moisture-removing mechanism used in a known steam turbine.

In this embodiment, the hydrophilic coating portion 21 has a predetermined width and extends across the concave surface of the nozzle 20 toward the outer end thereof. As described in the first embodiment, water droplets are deposited on the concave surface of the nozzle 20 to gather and form water films which flow to the trailing edge thereof. When the water film flows reach the hydrophilic coating portion 21, the flows are guided to a circumferential wall disposed outside the nozzle 20. A drain catcher as shown in FIG. 15 is provided outside the nozzle 20 to remove and discharge the water film flows from the main stream.

According to this embodiment, a moisture-removing effect equivalent to that of the known technique of forming grooves on blades can be achieved without causing aerodynamic loss or increasing the cost of mechanical processing.

According to this embodiment, therefore, the drain can be efficiently separated and removed from the nozzle 20 simply by forming the hydrophilic coating portion 21. In addition, the size of water droplets released from the trailing edge of the nozzle 20 can be minimized without performance degradation or significant cost increase by uniformly diffusing water film flows to reduce the thickness thereof.

Third Embodiment

Figure 4:
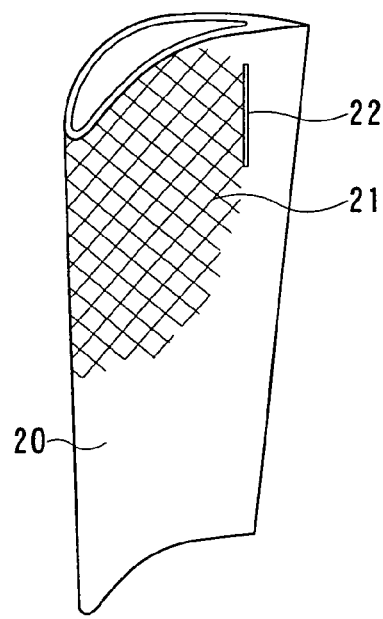
FIG. 4 is a diagram of a nozzle according to a third embodiment of the present invention.

A steam turbine and a hydrophilic coating material used therefor according to a third embodiment of the present invention will be described with reference to FIG. 4. In this embodiment, the same components as used in the first embodiment are indicated by the same reference numerals to remove redundant description.

In this embodiment, a slit 22 is formed in the concave surface of the nozzle 20, and the hydrophilic coating portion 21 is formed on the upstream side of the slit 22. Although it is preferred to increase the length of the slit 22 in terms of moisture removal, the length should be minimized in terms of nozzle strength and aerodynamic effect. In this embodiment, the hydrophilic coating portion 21 is formed in a wide area from the upstream side of the nozzle 20 to the slit 22, and the length of the hydrophilic coating portion 21 decreases gradually to the length of the slit 22.

According to this embodiment, water film flows generated by the moisture deposited in a wide area can be guided and sucked into the slit 22 to reduce the amount of erosion even if the length of the slit 22 is minimized.

Fourth Embodiment

A steam turbine and a hydrophilic coating material used therefor according to a fourth embodiment of the present invention will be described with reference to FIG. 5. In this embodiment, the same components as used in the first embodiment are indicated by the same reference numerals to remove redundant description.

In this embodiment, the hydrophilic coating portion 21 is formed in a predetermined area of a surface of each of buckets 23 along the leading edge thereof.

Moisture contained in the main stream and water droplets formed on the upstream side nozzle 20 are deposited on the hydrophilic coating portion 21. A large centrifugal force moves the water droplets to the outer end (blade top) of a bucket (moving blade) 23 along the hydrophilic coating portion 21. Water droplets are finally flown from the outer end of the bucket 23 to a drain catcher 25 provided in a turbine casing 24, and the drain catcher 25 discharges the water droplets from the main stream.

The hydrophilic coating portion 21 may be formed in an area of the bucket 23 where water droplets collide directly therewith. According to experiments performed by the inventors, the area of the bucket 23 where the hydrophilic coating portion 21 is formed may be specified by the following condition:

$$0 \leq L/C \leq 0.5$$

wherein "C" is the chord length of the bucket 23 and "L" is the length of the area where the hydrophilic coating portion 21 is formed from the leading edge of the bucket 23 along the chord length thereof.

According to this embodiment, water films flows can be uniformly diffused to reduce the thickness thereof by forming the hydrophilic coating portion 21 at the leading edge of the bucket 23. This allows for a reduction in the amount of erosion.

Fifth Embodiment

Figure 6:
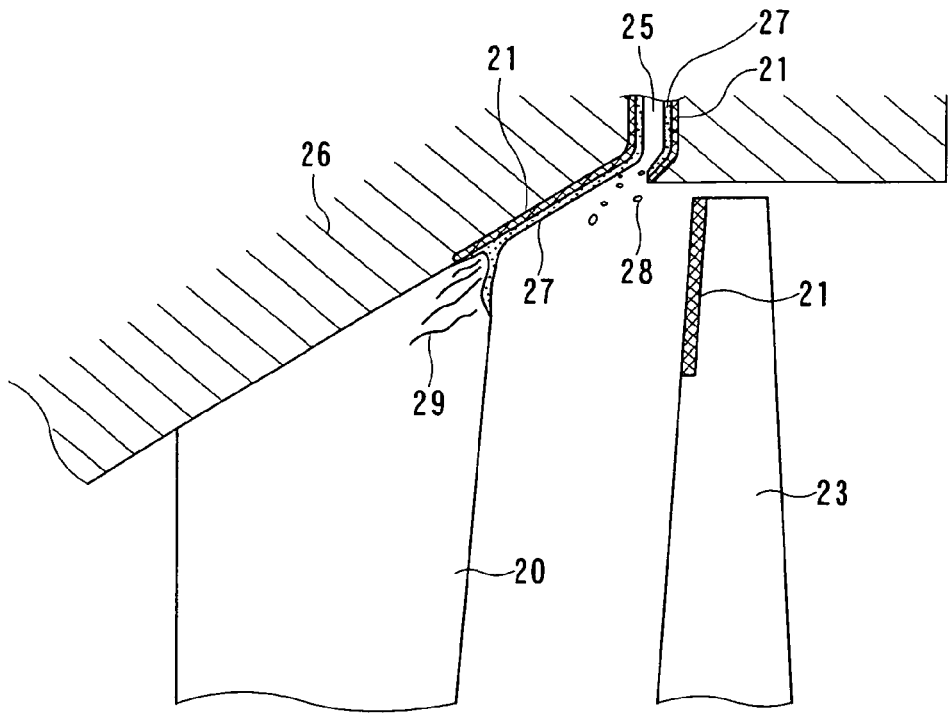
FIG. 6 is a diagram of a steam turbine according to a fifth embodiment of the present invention.

A steam turbine and a hydrophilic coating material used therefor according to a fifth embodiment of the present invention will be described with reference to FIG. 6. In this embodiment, the same components as used in the first embodiment are indicated by the same reference numerals to remove redundant description.

In this embodiment, the hydrophilic coating portion 21 is formed on a surface of an outer diaphragm ring 26 facing the steam path and a channel surface of the drain catcher 25. The hydrophilic coating portion 21 is also formed on a predetermined area along the leading edge of the bucket 23.

A centrifugal force causes most of moisture deposited on the nozzle 20 or the bucket 23 to gather to the wall surface of the outer diaphragm ring 26 and form water film flows 29 and water films 27. In the known art, the steam flow can scatter the water films 27 as coarse water droplets 28. Accordingly, the drain catcher 25 is provided to discharge the water films 27 flowing across the wall surface of the outer diaphragm ring 26 and the water droplets 28 contained in the operating fluid from the turbine system, and the water films 27 are guided to the outer diaphragm ring 26.

The water films 27, however, can be released into the main stream as the coarse water droplets 28 again because the water films 27 are not uniform or stable.

In that case, the drain catcher 25 can fail to discharge the water films 27 effectively.

According to this embodiment, the hydrophilic coating portion 21 is formed on the surface of the outer diaphragm ring 26 facing the steam path and the channel surface of the drain catcher 25 to uniformly diffuse and keep the water films 27 on the wall surface of the outer diaphragm ring 26. The hydrophilic coating portion 21 thus allows effective removal of the moisture through the drain catcher 25. Without the drain catcher 25, the hydrophilic coating portion 21 may be formed on the surface of the outer diaphragm ring 26 to prevent the release of the water droplets 28 from the water film flows 29 on the wall surface thereof, thereby providing the effect of preventing erosion.

Sixth Embodiment

Figure 7:
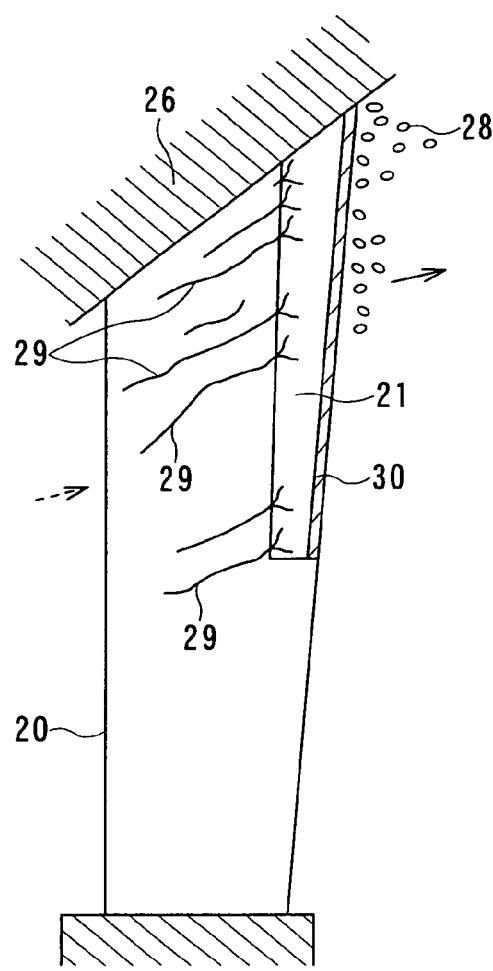
FIG. 7 is a diagram of a steam turbine according to a sixth embodiment of the present invention.
Figure 8:
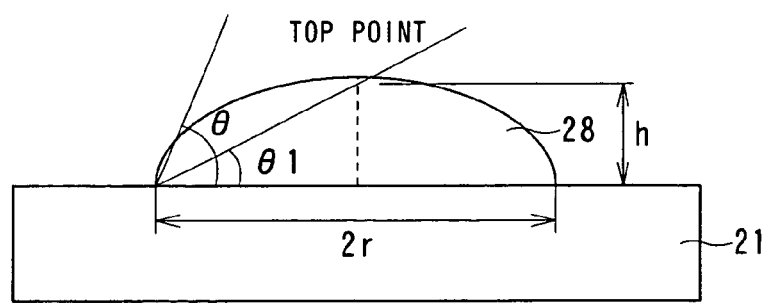
FIG. 8 is a diagram illustrating definition of a contact angle between a hydrophilic coating portion and a water droplet deposited thereon.
Figure 9:
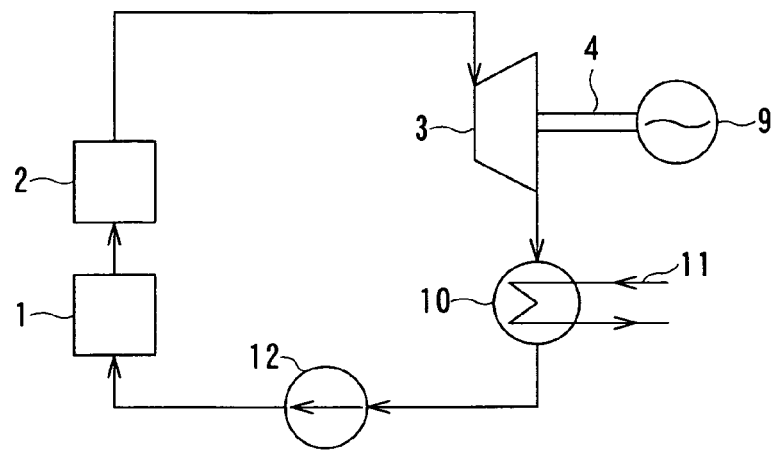
FIG. 9 is a schematic system diagram of a known thermal power plant including a steam turbine.
Figure 10:
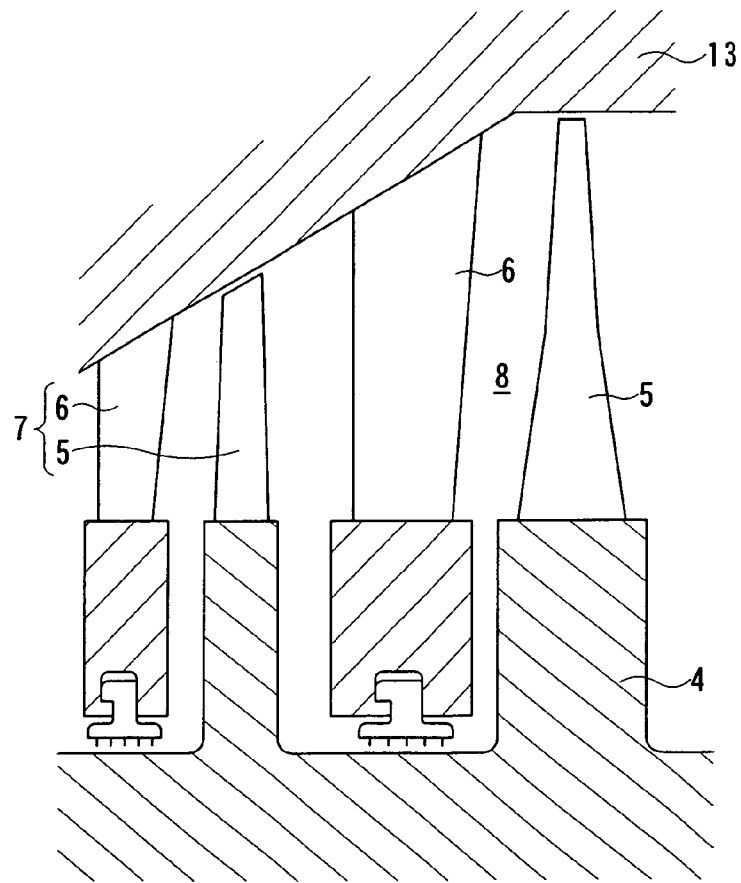
FIG. 10 is a diagram of cascades of nozzles and buckets of a known steam turbine.
Figure 11:
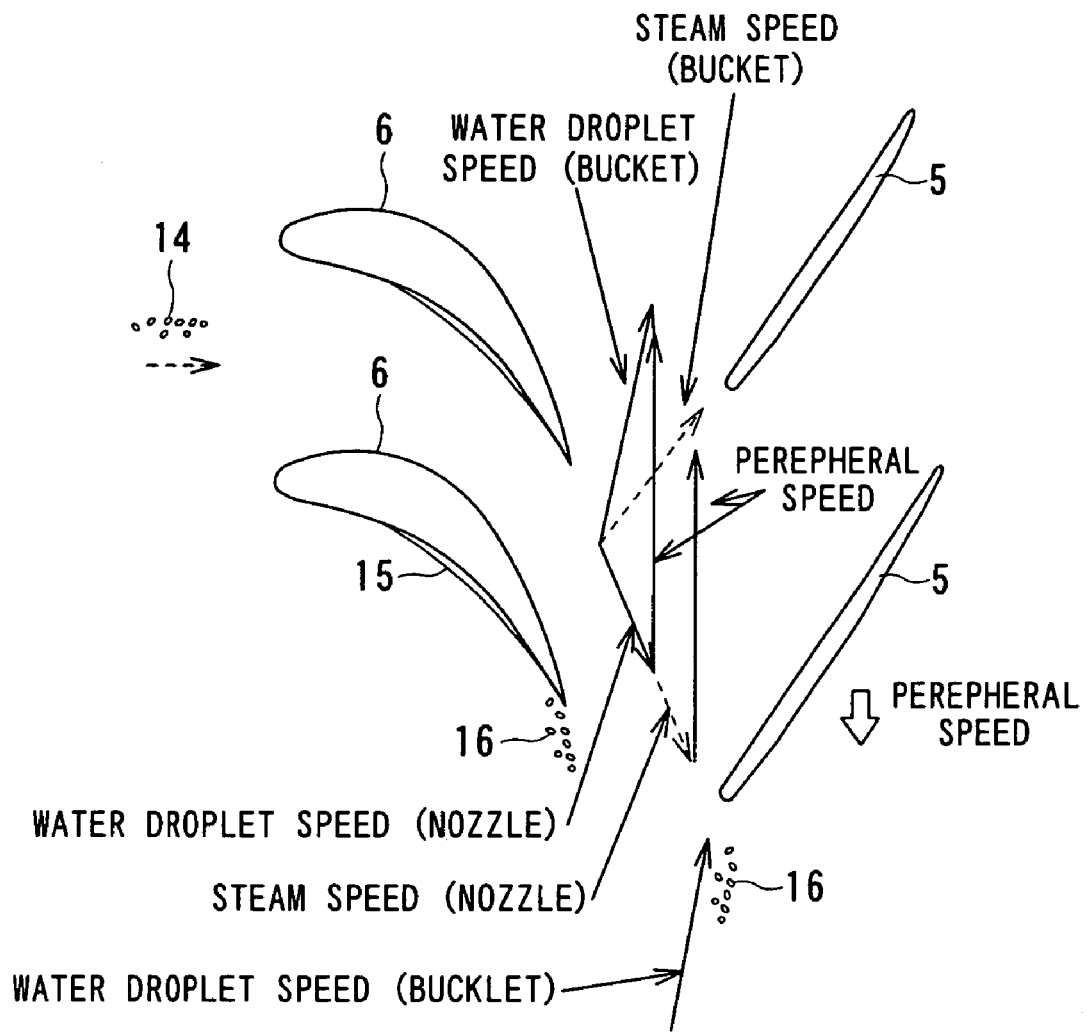
FIG. 11 is a velocity diagram showing a relationship between the nozzles, the buckets, and water droplets in the known steam turbine.

A steam turbine and a hydrophilic coating material used therefor according to a sixth embodiment of the present invention will be described with reference to FIG. 7. In this embodiment, the same components as used in the first embodiment are indicated by the same reference numerals to remove redundant description.

Figure 1:
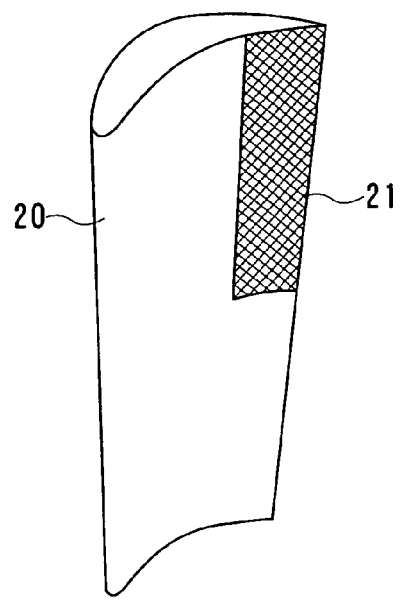
FIG. 1 is a diagram of a nozzle having a hydrophilic coating portion according to a first embodiment of the present invention.

In this embodiment, a water-repellent coating portion 30 is formed only at the trailing edge of the nozzle 20 shown in FIGS. 1 and 2.

According to this embodiment, the water film flows 29 are collected and sufficiently diffused by the hydrophilic coating portion 21 to reach the water-repellent coating portion 30, which forcedly releases the water film flows 29 from the surface of the nozzle 20. The water-repellent coating portion 30 can therefore sufficiently reduce the size of the water droplets 28 and the effect on the downstream side bucket (not shown) to enhance the effect of the first embodiment.

In the example described above, the water-repellent coating portion 30 is formed on the nozzle 20. The hydrophilic coating portion 21 and the water-repellent coating portion 30 may thus be used in combination to control the moisture deposited on the surfaces of the blades or a wall surface of a steam path without any adverse effect on the aerodynamic properties of the turbine.

Seventh Embodiment

A hydrophilic coating material used for the hydrophilic coating portion 21 according to any of the first to sixth embodiments will be described. In this embodiment, the hydrophilic coating portion 21 is formed of $SiO_2$.

In this embodiment, small amounts of water and acetic acid were added to tetraethoxysilane ($Si(OC_2H_5)_4$), and the solution was diluted with ethanol to prepare a coating liquid. This coating liquid was sprayed onto the nozzle 20, dried and hydrolyzed at room temperature for one day, and then heated with hot air at 100° C. in air for 20 hours. The resultant coating was an amorphous film having a thickness of about 0.2 μm and an open porosity of about 10%.

Figure 16:
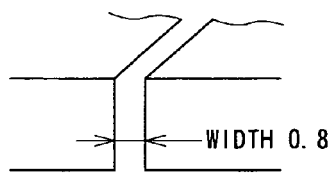
FIG. 16 is a table showing proportion of the amount of water collected through a slit to the amount of water supplied in the cases where a hydrophilic coating portion is formed and where no hydrophilic coating portion is formed.
Figure 16:
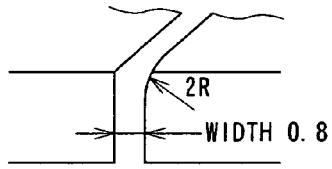
Figure 16:
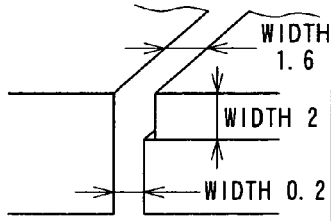
Figure 16:
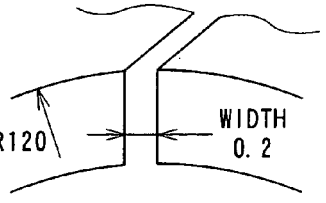
Figure 16:
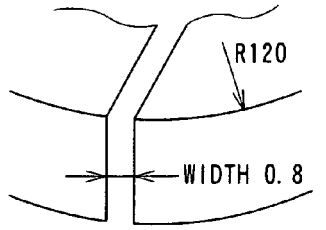

FIG. 16 summarizes the results of an experiment conducted on the hydrophilic coating portion 21.

This experiment was conducted on five types of rectangular plates having slits with the same width but different shapes, namely, slit types A to E. For each slit type, a plate having the hydrophilic coating portion 21 and a plate having no hydrophilic coating portion were prepared. That is, ten plates were prepared in total. A predetermined amount of water was allowed to flow from one end of each plate by inclining the plate. The amount of water falling into the slit and the amount of water recovered at the other end of the plate were measured.

In FIG. 16, the item "proportion of amount of water collected through slit to amount of water supplied" refers to the proportion of the amount of water recovered below the slit to the amount of water supplied from the end of the plate. The item "proportion of amount of water recovered to amount of water supplied" refers to the proportion of the total amount of water recovered at the other end of the plate and below the slit to the amount of water supplied from the end of the plate.

According to FIG. 16, the coated and uncoated plates of each slit type were substantially equivalent, only with a slight error, in the proportion of the amount of water recovered to the amount of water supplied. On the other hand, the coated plates of the slit types A, B, and E were larger in the proportion of the amount of water collected through the slit than the uncoated plates of the same slit types. These results clearly demonstrate the effect of the hydrophilic coating portion 21 according to this embodiment, particularly for the slit type E, which has a concave surface similar to that of a turbine blade.

The hydrophilic coating portion 21 was formed on the components of the steam turbine, such as the nozzles 20, the buckets 23, a turbine rotor, the turbine casing 24, and the outer diaphragm ring 26. As a result, finer water droplets were released, and the erosion resistance of the blades of the subsequent stages was improved in comparison with a steam turbine having no coating.

Eighth Embodiment

As in the seventh embodiment, a coating material mainly containing an organic silicon compound having a siloxane bond (Si—O) was sprayed onto the limited area of the radially outer portion of the concave surface of the nozzle 20 shown in FIG. 1 along the trailing edge thereof and was cured by heating with hot air at 100° C. for 20 hours. The resultant coating was an amorphous silicon oxide film having a thickness of about 1 μm and an open porosity of about 7%.

In this case, finer water droplets were released, and the erosion resistance of the blades of the subsequent stages was improved in comparison with a steam turbine having no coating.

Ninth Embodiment

Figure 5:
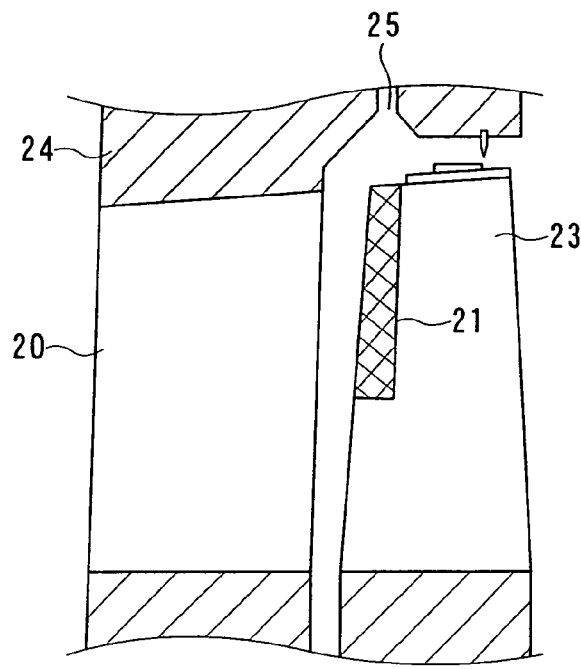
FIG. 5 is a diagram of a steam turbine according to a fourth embodiment of the present invention.

A hydrophilic coating material according to this embodiment was used to form a $TiO_2$ film in a limited area of a radially outer portion of the bucket 23 shown in FIG. 5 along the leading edge thereof.

In this embodiment, a small amount of ethylamine ($C_2H_7N$) was added to tetraisopropoxytitanium ($Ti(OC_3H_7)_4$), and the solution was diluted with ethanol to prepare a coating liquid. This coating liquid was applied to the limited area of the radially outer portion of the bucket 23 shown in FIG. 5 along the leading edge thereof by dipping. The applied coating liquid was hydrolyzed at room temperature and then heated at 400° C. in air for three hours. The bucket 23 was masked before the dipping so that the coating liquid could be applied only to the limited area. The resultant coating was an amorphous titanium oxide film having a thickness of about 0.5 μm and an open porosity of about 8%.

In this case, finer water droplets were released, and the erosion resistance of the blades of the subsequent stages was improved in comparison with a steam turbine that having no coating.

Tenth Embodiment

In this embodiment, a small amount of ethylamine was added to tetraisopropoxytitanium, and the solution was diluted with ethanol. Silicon oxide particles having an average particle size of about 8 nm were then dispersed and suspended in the solution to prepare a coating liquid. This coating liquid was applied to the limited area of the radially outer portion of the bucket 23 shown in FIG. 5 along the leading edge thereof by dipping. The applied coating liquid was hydrolyzed at room temperature and then heated at 400° C. in air for three hours. The resultant coating contained titanium oxide and silicon oxide in a molar ratio of 1:1 and had a thickness of about 1 μm and an open porosity of about 8%.

Thus, a coating composed of a mixed phase of $TiO_2$ and $SiO_2$ was formed in the limited area of the radially outer portion of the bucket 23 along the leading edge thereof. The steam turbine having the coating had higher performance and higher erosion resistance than those of a steam turbine having no coating.

Eleventh Embodiment

In this embodiment, small amounts of water and acetic acid were added to tetraethoxysilane, and the solution was diluted with ethanol. Titanium oxide particles having an average particle size of about 6 nm were then dispersed and suspended in the solution to prepare a coating liquid. This coating liquid was sprayed onto the limited area of the radially outer portion of the concave surface of the nozzle 20 shown in FIG. 1 along the trailing edge thereof and was dried at room temperature. The resultant coating contained silicon oxide and titanium oxide in a molar ratio of 2:1 and had a thickness of about 1.2 μm and an open porosity of about 7%.

Thus, a coating composed of a mixed phase of $TiO_2$ and $SiO_2$ was formed in the limited area of the radially outer portion of the concave surface of the nozzle 20 along the trailing edge thereof. The steam turbine having the coating had higher performance and higher erosion resistance than those of a steam turbine having no coating.

This application claims priority from Japanese Patent Application 2005-317609, filed Oct. 31, 2005 which is incorporated herein by reference in their entirety.

What is claimed is:

1. A steam turbine comprising:
   a turbine casing;
   a turbine rotor disposed in the turbine casing;
   a bucket implanted in the turbine rotor; and
   a nozzle disposed on an upstream side of the bucket and supported by the turbine casing, in which a plurality of stages, each including the bucket and the nozzle, are arranged axially in the turbine so as to define a steam path;
   wherein a hydrophilic coating portion is disposed in a limited area of a radial outer portion of a concave surface of the nozzle along a trailing edge thereof.

2. The steam turbine according to claim 1, wherein the hydrophilic coating portion is further disposed in an area of a convex surface of the bucket along a leading edge thereof.

3. The steam turbine according to claim 2, wherein the area of the bucket where the hydrophilic coating portion is disposed satisfies the following condition:

$$0 \leq L/C \leq 0.5$$

wherein "C" is a chord length of the bucket and "L" is a length of the area where the hydrophilic coating portion is disposed from the leading edge of the bucket along the chord length thereof.

4. The steam turbine according to claim 2, wherein the hydrophilic coating portion has a thickness of 0.05 to 150 m.

5. The steam turbine according to claim 2, wherein the hydrophilic coating portion has an open porosity of 30% or less.

6. The steam turbine according to claim 2, wherein the hydrophilic coating portion is disposed in a predetermined area extending along a height direction of the bucket.

7. The steam turbine according to claim 1, wherein the hydrophilic coating portion is further disposed in an area of the nozzle and the bucket which extends to an upstream side from a trailing edge thereof by a length of at least 10 mm.

8. The steam turbine according to claim 1, wherein the hydrophilic coating portion is further disposed in an area of the nozzle and the bucket so as to satisfy the following condition:

$$0.3 \leq h/H \leq 1.0$$

wherein "H" is a height of the nozzle and the bucket and "h" is a height of the area where the hydrophilic coating portion is disposed.

9. The steam turbine according to claim 1, wherein the nozzle is provided with a slit which communicates with an inside thereof, and the hydrophilic coating portion is further disposed on an entire surface of the nozzle where the slit is provided.

10. The steam turbine according to claim 9, wherein the hydrophilic coating portion is disposed in a predetermined area on an upstream side of the slit.

11. The steam turbine according to claim 1, wherein openings are provided in an inner circumferential surface of the turbine casing, and the hydrophilic coating portion is further disposed on the inner circumferential surface of the turbine casing.

12. The steam turbine according to claim 11, wherein the openings are provided in areas of the inner circumferential surface of the turbine casing on a downstream side of the trailing edge of the nozzle and near leading edges of buckets disposed downstream of the nozzles, and the hydrophilic coating portion is disposed in a vicinity of each of the openings.

13. The steam turbine according to claim 1, wherein the hydrophilic coating portion includes a water-repellent coating portion adjacent to a film area of the hydrophilic coating portion.

14. The steam turbine according to claim 1, wherein the hydrophilic coating portion has a water contact angle of 20° or less.

15. A hydrophilic coating material used for the hydrophilic coating portion of the steam turbine according to claim 1, the hydrophilic coating material comprising an oxide ceramic.

16. The hydrophilic coating material according to claim 15, wherein the oxide ceramic mainly contains at least one of silicon oxide and titanium oxide.

17. The hydrophilic coating material according to claim 16, wherein the silicon oxide is amorphous.

18. A steam turbine comprising:
a turbine casing;
a turbine rotor disposed in the turbine casing;
a bucket implanted in the turbine rotor; and
a nozzle disposed on an upstream side of the bucket and supported by the turbine casing, in which a plurality of stages, each including the bucket and the nozzle, are arranged axially in the turbine so as to define a steam path;
wherein the nozzle is provided with a slit which communicates with an inside thereof,
wherein a hydrophilic coating portion is disposed in a limited area of a radial outer portion of a concave surface of the nozzle along a trailing edge thereof.

19. The steam turbine according to claim 18, wherein openings are provided in an inner circumferential surface of the turbine casing, and the hydrophilic coating portion is further disposed on the inner circumferential surface of the turbine casing.

20. The steam turbine according to claim 19, wherein the openings are provided in areas of the inner circumferential surface of the turbine casing on a downstream side of a trailing edge of the nozzle and near leading edges of buckets disposed downstream of the nozzles, and the hydrophilic coating portion is disposed in a vicinity of each of the openings.

* * * * *